Dec. 9, 1930.          G. THORNTON-JONES          1,784,357
APPARATUS FOR THE PROJECTION OF LIGHT RAYS
Filed April 12, 1929      2 Sheets-Sheet 1

Dec. 9, 1930.  G. THORNTON-JONES  1,784,357
APPARATUS FOR THE PROJECTION OF LIGHT RAYS
Filed April 12, 1929  2 Sheets-Sheet 2
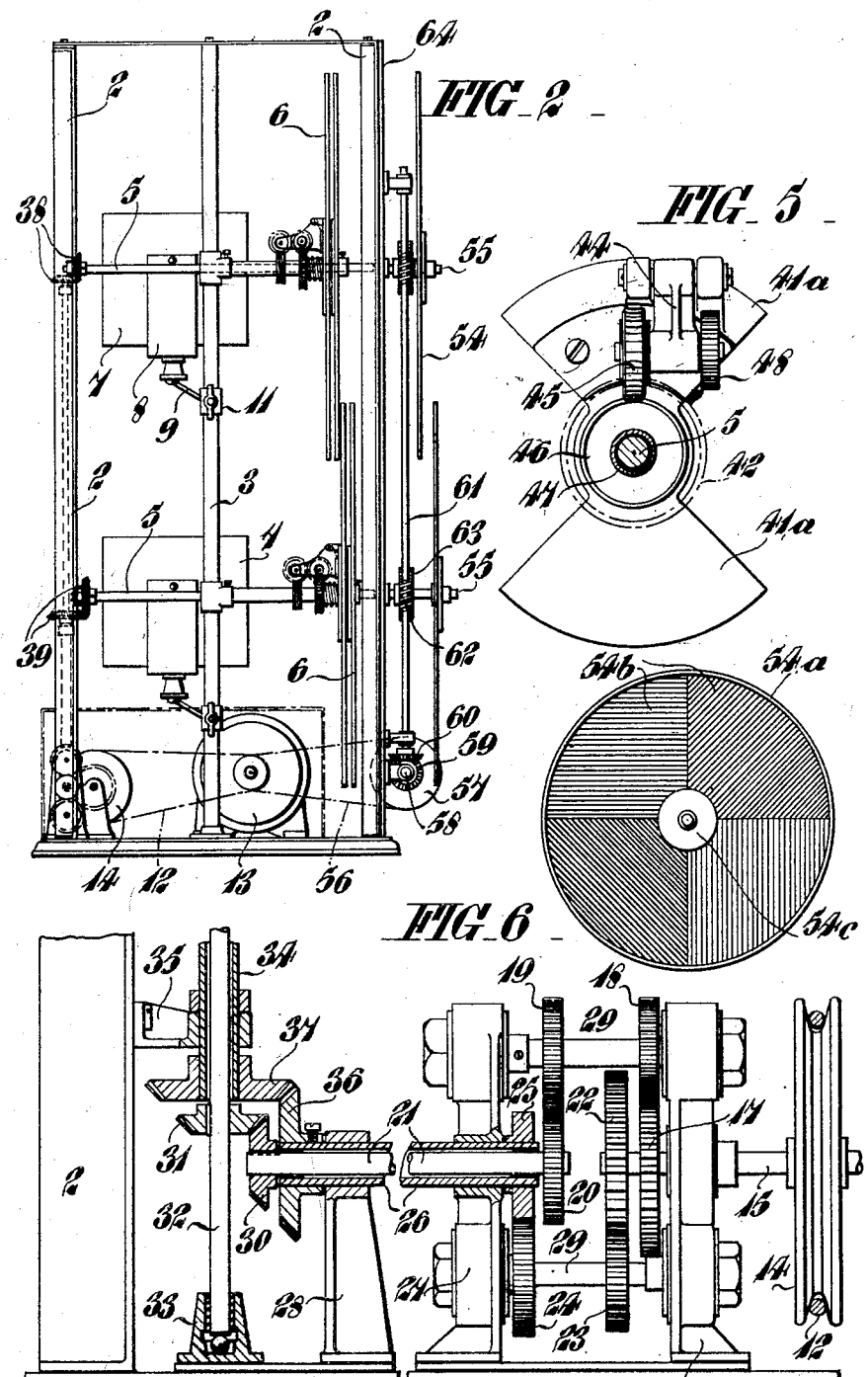

Patented Dec. 9, 1930

1,784,357

UNITED STATES PATENT OFFICE

GILBERT THORNTON-JONES, OF SHERWOOD, NOTTINGHAM, ENGLAND

APPARATUS FOR THE PROJECTION OF LIGHT RAYS

Application filed April 12, 1929, Serial No. 354,639, and in Great Britain June 20, 1928.

This invention comprises apparatus for the projection of light rays an important object of the invention being to provide a novel means for and mode of projecting on to or through a screen or other surface coloured light effects of practically unlimited variation, the invention being particularly applicable for advertising purposes and for producing multi-colour lighting or scenic effects on the theatrical stage.

Broadly the apparatus according to the present invention embodies a light projector, a light shutter, said shutter being composed of a plurality of members located one in front of another, openings in said shutter members, means for effecting continued motion of the shutter members relatively to each other to vary the size and/or formation of the light passages through the combined shutter members, and means for producing coloured light effects by the beam projected through the shutter.

Advantageously the composite shutter is adapted to be rotated between the light source and the focus thereof, and one or more coloured transparent or translucent screens is or are located in the light beam projected through said shutter at a suitable distance beyond the focus.

The invention also includes an arrangement wherein the apparatus as above-described is duplicated or multiplied and the whole constructed as one apparatus operated from a single drive or source of power.

For the purpose of more fully describing the nature of this invention reference will now be made to the accompanying drawings, wherein:—

Figure 2 is a side elevational view of the same apparatus.

Figure 4 is a part-sectional elevation showing on an enlarged scale the main driving gear from the motor.

Figure 5 is a rear elevational view, also enlarged, of the gear for transmitting relative rotation to the discs of a dual shutter.

Figure 6 illustrates a suitable colour screen for use in front of the shutters.

Figure 1:
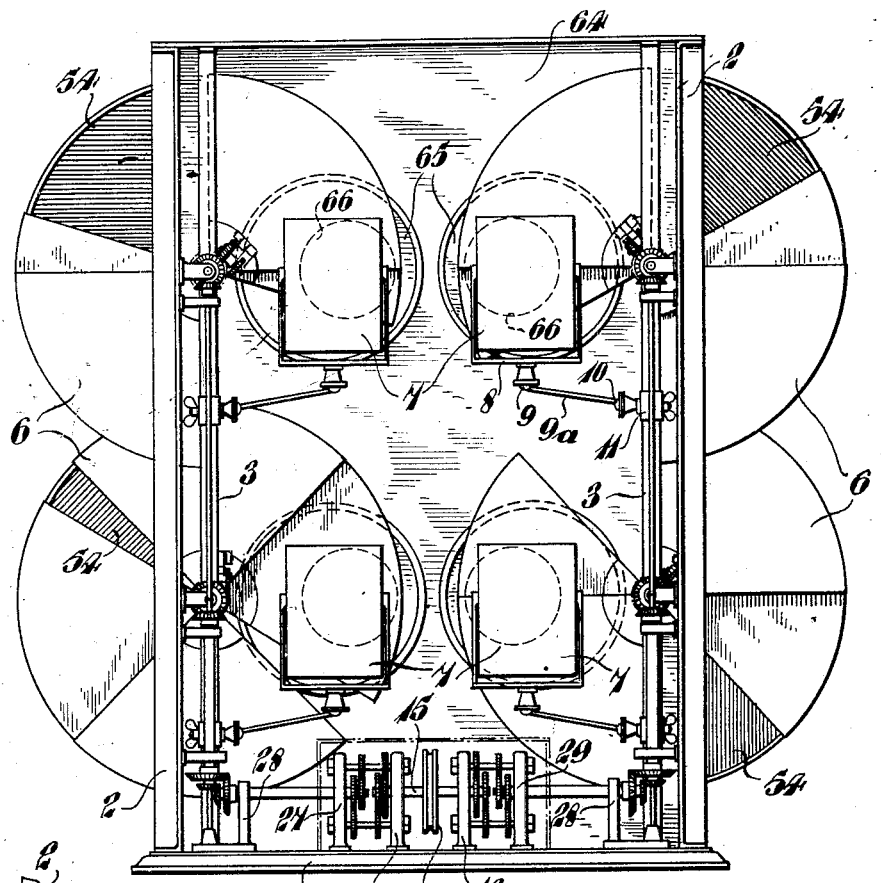
Figure 1 is a rear elevational view of apparatus in accordance with the present invention.

In one method of carrying out the invention the apparatus may be carried by a frame comprising a rectangular base 1, with four upstanding corner posts 2, preferably of angle section, a further upstanding post 3, preferably tubular, being located approximately midway between each pair of corner posts at each side of the frame, and the whole being connected at the top by a suitable plate or by cross pieces.

Extending from front to rear of the frame at each side thereof, and preferably carried by brackets 4 on the front and rear angle uprights 2 and passing through the tubular posts 3, are two rotatable spindle members 5, suitably spaced one above the other and constituting the axes of rotation of light shutters 6. In this way four shutters are provided, each shutter being advantageously composed of a pair of metal discs 6a, 6b mounted substantially close one behind the other, and each disc is provided with one or more openings for the passage of light.

At a suitable distance to the rear of each double shutter 6 is mounted an electric or other convenient light projector or lamp 7 with suitable reflector, said lamps being preferably positioned to direct a light beam on to that half of each shutter 6 projecting into the upstanding frame.

Advantageously each lamp is pivotally mounted in a forked or similar bracket 8 connected by ball and socket or other universal joint 9 to an arm 9a which is itself connected by a similar universal joint 10 to a collar 11 adjustably mounted upon one of the vertical frame tubes 3 or other frame member. In this way the location of each lamp and the angle of the projected light therefrom is adjustable to a very considerably extent.

The several double-disc shutters are adapted to be rotated simultaneously from one source of power, and in one method of doing this a driving belt 12 from a motor 13 suitably carried by the apparatus baseplate 1 passes over a pulley 14 fixed on a drive shaft 15 suitably borne in standards 16 on each side of said pulley. The drive from said shaft 15 is transmitted by two trains of intermeshing gears 17, 18, 19, 20 (Figure 4) to two spindles 21, and by two other trains of gears 22, 23, 24 and 25 to two sleeves 26 rotatably accommodating said spindles 21, said sleeves being rotatably carried within bearings in further standards 27, 28. The standards 16 and 27 also carry short spindles 29 on which are mounted the gear wheels 18, 19 and 23, 24.

Each spindle 21 carries at its outer end a bevel 30 meshing with another bevel 31 fixed to a vertical shaft 32 rotatably carried at its base in a socket 33 and preferably on a ball or other antifriction bearing, each of said shafts 32 being rotatable within a vertical hollow shaft 34 carried in bracket bearings 35 secured to the rearmost corner frame members 2. Each hollow shaft 34 is rotated from a bevel 36 fixed at the outer end of each sleeve 26 and meshing with another bevel 37 on said hollow shaft.

The two upper light shutters 6 are driven from the shafts 32 through further intermeshing bevels 38, said shafts extending up beyond the hollow shafts 34, from which latter the lower shutters are rotated through intermeshing bevels 39. It will thus be seen that all shutters are simultaneously rotated in the same direction.

Figure 3:
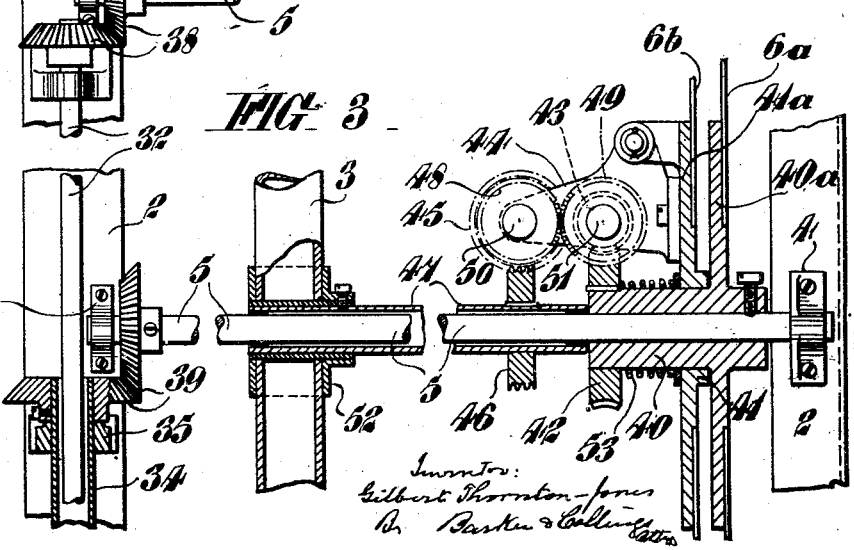
Figure 3 is a part-sectional side elevational view showing on an enlarged scale the gearing through which the shutters are driven.

The two discs 6a, 6b, constituting the dual shutters 6 are each advantageously composed of a pair of diametrically opposed sector shaped plate portions bolted or otherwise secured to similarly shaped flanges 40a, 41a extending radially from central bosses 40, 41 respectively (Figure 3), the latter being a comparatively small boss and rotatably mounted upon the former which is preferably in the form of a sleeve and is fixed to the shutter spindle 5. It will be seen that shutters constructed as above have two sector-shaped diametrically opposed openings through which light may be projected from a lamp 7.

It is required that one disc of each dual shutter should rotate slightly faster than the other in order that light passages through said shutters of gradually and continually varying sizes are obtained in the operation of the apparatus. In one method of accomplishing this, the drive from the motor through the before-described gears is transmitted directly to the sleeve-like boss 40 fixed to spindle 5 and carrying the front shutter disc 6a. A worm wheel 42 fixed to said boss 40 engages a worm 43 rotatably carried by a bracket 44 secured to the flange member 41a of boss 41, and by reason of the engagement between worm 43 and wheel 42 the rearmost disc 6b is simultaneously rotated. However, during rotation, a second worm wheel 45, which is carried by the said bracket 44, is rotated by its engagement with a fixed worm 46 on a non-rotating sleeve 47, the rotation of said second worm wheel 45 being transmitted through a pair of intermeshing gears 48, 49 to the first-named worm 43 meshing with worm wheel 42 and in so doing the movement of the rearmost disc 6b is rendered somewhat slower than that of the foremost disc 6a. It is to be understood that the two intermeshing gears 48, 49 are fixed upon short axles 50, 51 which are rotatable in the bracket 44 and carry the worm wheel 45 and worm 43 respectively.

The non-rotating sleeve 47 accommodating the rotary spindle 5 may be fixed by a flanged collar 52 to the aforesaid upstanding tubes 3. The rearmost of the two discs of a shutter is held in position by a coiled spring 53.

The gearing through which the shutters are driven from the motor is advantageously such as to rotate the several shutters at different relative speeds. For example, the first gear wheel of each train (17 or 22) may be equal, but a difference of say one tooth may be made in certain of the other gear wheels so as to obtain the required difference in the final drive; it being understood that each of the four gear trains (i. e. two on each side of the drive pulley 14) has a corresponding difference.

The aforedescribed dual shutters are advantageously located between the source of light and the focus thereof, and at a suitable distance beyond, and not too close to, said focus, that is to say in each diverging light beam is positioned a screen of glass or other transparent or translucent material, said coloured screens being indicated at 54. One of these coloured screens is rotatably mounted upon a spindle 55 in axial alignment with and projecting forward from each of the aforesaid shutter spindles 5, and each screen embodies one or more colours or tints. Suitable means are incorporated for transmitting to the said coloured screens a relatively slow rotary motion, and if desired the several screens may rotate at relatively different speeds.

In the operation of the apparatus the light passages through the duel shutters 6 are moved, by the rotation of said shutters, across the light beam as it converges to the focus, and as the two discs of each shutter rotate relatively to each other the light passages therethrough are continually varied in size thus gradually reducing or increasing the amount of light passing through the shutters. The light from the lamps is directed through the shutter openings through the rotating colour screens 54 on to a receiving screen or surface and it is to be understood that the four projected light beams are advantageously all so directed as to converge and become mingled one with the other after passing through the several coloured screens, all of the colours becoming intermixed on the receiving screen.

Each colour screen may comprise a frame 54a (Figure 6) into which is fitted a plurality, say four, of sector-shaped glass portions 54b of differing colours, said frame having a central boss 54c by which the screen is mounted on the aforesaid spindle 55.

The rotation of the colour screens may be transmitted from the shaft to the motor 13 through belt or chain 56 to pulley 57 on shaft 58, said shaft carrying at or near each end a bevel 59 coacting with second bevel 60 at the lower end of a vertically extending spindle 61, which spindle carries worms or the like 62 intermeshing with worm wheels 63 on the screen spindles 55. In this way all of the four colour screens are simultaneously rotated and suitable means may be provided for causing the several discs to rotate at different speeds. This can be determined by the number of teeth in the worm wheel 63.

The accurate projection of the light beams from the several lamps may be assisted by providing a short distance in front of the several dual shutters 6 a black plate or sheet 64 which advantageously extends across the entire front of the apparatus frame and may be secured to the front corner uprights thereof. This frame is formed with four circular openings therein, one for each beam, and each opening has associated therewith a rotatable disc 65 containing an opening 66 eccentric to the axis of the disc. Each of the several discs 65 is adapted to be rotated by hand so as to vary the position of the opening 66 therein and in so doing the throw of the light is varied as desired. It will be understood that the black plate 64 effectively prevents the projection of any light forward from the apparatus other than that directed through the opening 66 on to and through the colour screens.

Additionally an iris diaphragm may be associated with each opening 66 and/or with the light projector and it is also to be understood that the opening 66 may be of any desired shape other than circular, such for example as square.

The light effects obtained by the apparatus may be further varied by providing means for intermittently altering the focus of each projector and/or by providing means for continually or intermittently varying the dimensions of the opening 66 in the rotatable discs 65 or of the iris diaphragm provided in such opening or in connection with the lamp, and this operation may if desired be effected automatically.

If desired, the several colour screens 54 may be rotated by hand and normally held from rotation during the working of the apparatus. Alternatively, the shutters may be rotated at equal speeds, and in such arrangement, where the screens are, as illustrated, provided with differently coloured sectors, same are advantageously so mounted that the coloured sectors of each screen have a lead on those of the other screens, that is to say, a different colour of each screen comes into action a suitable time ahead of the other screens.

In another arrangement a single rotary or otherwise displaceable screen may be employed in front of the several light projectors and shutters.

The several dual shutters may be driven from separate motors, e. g. a motor for each shutter, the driving being effected at different speeds either direct from said motors in which case any known or suitable means for effecting speed variation of the motors is employed or through suitable gearing.

In a simplified embodiment of the invention a lesser number of the dual rotating shutters 6, light projectors 7 and colour screens 54 may be installed in the apparatus, the drive to the several movable members being modified to suit. For example only one of said dual shutters may be installed in which case a single lamp and colour screen would be provided, the relative disposition of said shutters, lamp and screen being, if desired, as previously described.

I claim:—

1. Apparatus for projecting light rays embodying a light projector, a shutter in front of said light projector, said shutter composed of a plurality of members located one in front of another, openings in said shutter members, means for effecting continued motion of the shutter members relatively to each other to vary the formation of the light passages through the combined shutter members, and means for producing coloured light effects by the light beam projected through the shutter.

2. Apparatus for projecting light rays embodying a light projector, a composite shutter rotatably mounted in front of said light projector between same and the focus thereof, said shutter composed of a plurality of members arranged one in front of another, light openings in said shutter members, means for rotating said members relatively to each other to vary the light passage through the combined members, and a colour screen located in the path of the projected light beyond the focus.

3. Apparatus for projecting light rays embodying a light projector, a composite shutter in front of said projector, said shutter comprising two plates or discs with light openings therethrough, means for rotating the members of said composite shutter at different relative speeds, a transparent or translucent colour screen in front of the shutter in the path of the light beam through said shutter, means for rotating said screen, and means for adjustably determining the direction of throw or projection of said light beam from the apparatus.

4. Apparatus for projecting light rays comprising a lamp, an adjustable mounting therefor, a light shutter, means for rotating said shutter in front of said lamp, said shutter comprising a pair of disc members each having light passages or openings therein, means for varying the speed of one shutter disc relatively to that of the other so as continually to vary the formation of the light passage through the combined discs, a colour screen in front of said shutter, means for rotating said screen, said screen embodying a plurality of differently coloured transparent or translucent portions, and means for directing the projected light in a predetermined direction on to the screen and through same to a receiving surface or object.

5. Apparatus for projecting light rays comprising a plurality of light projectors, a rotary shutter in front of each projector, each shutter comprising a plurality of discs or plates located one in front of another on a common axis, light openings through said shutter discs, means for simultaneously rotating the plurality of shutters, means for rotating the discs of each shutter at differing speeds so as to produce continually varying light passages therethrough, and a transparent or translucent colour screen in front of each shutter.

6. Apparatus for projecting light rays comprising a plurality of light projectors, an adjustable mounting for each projector, a duel light shutter rotatably mounted in front of each projector, means for simultaneously rotating said duel shutters at different speeds, means for rotating one member of each shutter at a speed different from that of the other member, light passages in each shutter, said passages being continually varied in size and/or shape during the rotation of the shutters, a rotary screen mounted in front of each dual shutter, means for transmitting rotation simultaneously to the several screens, said screens embodying transparent or translucent parts of differing colours and means for ensuring that the projected light beams through the several shutters and screens are so directed as to converge and become mingled one with another upon a suitable receiving surface or object in front of the colour screens.

7. Apparatus for projecting light rays, comprising a frame, a plurality of lamps carried by said frame, an adjustable mounting for each lamp, rotatable spindles in said frame, light shutters mounted on said spindles in front of the lamps, a power unit, means for simultaneously rotating the several shutters from said power unit, said shutters each comprising a pair of closely disposed discs with light openings therethrough, means whereby the rotation transmitted to one of said discs automatically transmits rotation at a different speed to the adjacent disc so as to vary the formation of the light openings through the combined discs, a cover plate extending in front of the several shutters, light openings in said cover plate, said openings being located in front of the shutters, means for adjusting the position of said openings so as to determine the direction of throw of the light beam, a colour screen in front of each opening in said cover plate, said screen embodying transparent or translucent portions for determining the colour of the light projected therethrough on to any suitable surface or object.

8. Apparatus for projecting light rays, embodying an upstanding frame, a plurality of lamps within said frame, reflectors associated with said lamp, adjustable supports for the lamps, said supports embodying universal connections for permitting variation of the disposition of the lamps and the direction of light therefrom, horizontally disposed spindles in the frame, a power unit, means for transmitting rotary motion to said horizontal spindles from said power unit, dual shutter members, one of said shutters being located on each rotatable horizontal spindle, said shutters being rotatable in front of said lamps, light openings in said shutters, means for transmitting relatively different speeds of rotation to the component parts of the dual shutters so as to vary the formation of the light openings therethrough, a cover plate extending in front of the several shutters and lamps, rotatable discs in said cover plate, a light opening in each of said discs, said opening being disposed eccentric to the axis of rotation of said disc and being adapted by rotation of said disc to vary the throw of light through the shutter located at the rear thereof, colour screens located in front of the cover plate, one of said screens extending in front of each of the said light openings in the cover plate, means for simultaneously rotating the several colour screens on individual axes, and means whereby the rotation of said colour screens is transmitted from the aforesaid driving unit.

9. Apparatus for projecting light rays comprising an upstanding frame, a driving unit in said frame, a plurality of suitably spaced horizontal spindles extending from the front to the rear of said frame, a train of gears intermediate of the driving unit and each of said horizontal spindles for transmitting a separate and different drive to each spindle, a light shutter mounted on each spindle, each light shutter comprising a pair of closely disposed discs arranged face to face, one of said discs being rotated directly from the shutter spindle and the second of said discs being rotated through suitable gearing from the first disc but at a relatively different speed, light openings in each disc of the dual shutter, a lamp mounted at the rear of each shutter on the interior of the frame, light reflecting means for each lamp, an adjustable mounting for each lamp, a cover plate extending in front of the several dual shutters, a plurality of rotatable discs in said plate, a light opening in each disc, each opening being disposed eccentrically to the axis of movement of the disc and being positioned to determine the direction of forward throw of the light beam passing through the shutter at the rear of the cover plate, colour screens in front of the cover plate, transparent or translucent members of different colours in said colour screens, and means for displacing the said colour members across the light beams projected through the several openings in the cover plate.

10. Apparatus for projecting light rays comprising a frame, a driving motor in said frame, a plurality of rotatably mounted horizontally disposed spindles spaced both vertically and horizontally within the frame, a common drive pulley to which motion is transmitted from the motor, means for transmitting independent rotary motion to each of said horizontal spindles from said drive pulley, said spindle driving means comprising separate trains of gears of differing gear ratios so as to transmit rotation to the spindles at relatively different speeds, dual light shutters mounted on said horizontal spindles, light openings through the two members of said dual light shutters, one shutter member being rotated at the speed of rotation of the shutter spindle and the second shutter member being rotated at a relatively different speed through gearing, a lamp at the rear of each dual shutter, a supporting member for each lamp, said supporting member being adjustable vertically upon frame members, universal joints associated with said lamp supporting means for permitting adjustment of the lamp in any direction, each lamp being so disposed as to project light on to the one half of a dual shutter, a cover plate in front of the several shutters, rotatable discs in said plate, one disc being disposed in front of each shutter, a light opening in each disc, means whereby rotation of the disc varies the position of the light opening relatively to the shutter spindles projecting axially of the several shutter spindles in front of the said cover plate, a colour screen carried by each projecting spindle, each colour screen embodying a plurality of transparent or translucent members of differing colours, means for transmitting rotary motion simultaneously to the several colour screens at relatively differing speeds and said motion transmitting means for the screens embodying gearing driven from the driving motor.

GILBERT THORNTON-JONES.